United States Patent
Wolf

(10) Patent No.: US 9,933,770 B2
(45) Date of Patent: Apr. 3, 2018

(54) LINKING AN AUTOMATION DEVICE TO A DATA PROCESSING SYSTEM

(71) Applicant: SIEMENS AKTIENGESELLSCHAFT, München (DE)

(72) Inventor: Edgar Wolf, Herrenberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 196 days.

(21) Appl. No.: 15/072,917

(22) Filed: Mar. 17, 2016

(65) Prior Publication Data
US 2016/0274555 A1 Sep. 22, 2016

(30) Foreign Application Priority Data
Mar. 18, 2015 (EP) ..................................... 15159555

(51) Int. Cl.
*G05B 19/18* (2006.01)
*G05B 19/042* (2006.01)
*H04L 12/00* (2006.01)

(52) U.S. Cl.
CPC ....... *G05B 19/042* (2013.01); *G05B 19/0423* (2013.01); *H04L 12/00* (2013.01); *G05B 2219/25205* (2013.01); *G05B 2219/25274* (2013.01)

(58) Field of Classification Search
CPC .......................... G05B 19/042; G05B 19/0423
See application file for complete search history.

(56) References Cited

U.S. PATENT DOCUMENTS

| 9,122,269 | B2 | 9/2015 | Wolf | |
|---|---|---|---|---|
| 2002/0138614 | A1* | 9/2002 | Hall | H04L 29/12009 709/225 |
| 2012/0047435 | A1 | 2/2012 | Holladay | |
| 2012/0117380 | A1 | 5/2012 | Herberth | |
| 2013/0138818 | A1 | 5/2013 | Wolf | |
| 2014/0020061 | A1* | 1/2014 | Popp | G06F 21/73 726/3 |
| 2014/0020081 | A1* | 1/2014 | Zhang | H04L 63/083 726/9 |
| 2016/0255167 | A1* | 9/2016 | Green | H04W 4/005 709/217 |

FOREIGN PATENT DOCUMENTS

DE 19834456 A1 2/2000

* cited by examiner

*Primary Examiner* — Vincent Tran
(74) *Attorney, Agent, or Firm* — Henry M. Feiereisen LLC

(57) ABSTRACT

A method and apparatus for linking an automation device to a data processing system is disclosed that creates a virtual device in the data processing system for the automation device. An identification number is generated in the data processing system as a function of a classification of the virtual device in the data processing system for identifying the virtual device. The identification number assigned to the virtual device and passed to a configuration tool that is designed to configure the automation device. The identification number is assigned by the configuration tool to a configuration dataset that is then loaded onto the automation device, stored in the automation device, and used by the automation device for the interaction of the automation device with the data processing system.

15 Claims, 2 Drawing Sheets

LINKING AN AUTOMATION DEVICE TO A DATA PROCESSING SYSTEM

CROSS-REFERENCES TO RELATED APPLICATIONS

This application claims the priority of European Patent Application, Serial No. 15159555.0, filed Mar. 18, 2015, pursuant to 35 U.S.C. 119(a)-(d), the disclosure of which is incorporated herein by reference in its entirety as if fully set forth herein.

BACKGROUND OF THE INVENTION

The invention relates to a method and apparatus for linking an automation device to a data processing system and a data processing system for performing the method.

The following discussion of related art is provided to assist the reader in understanding the advantages of the invention, and is not to be construed as an admission that this related art is prior art to this invention.

Automation devices, as well as devices in everyday use, are increasingly being developed and used to collect data for electronic servicing or value-added services. They must meet the following requirements:

The device must be identified, so that data sent by it can be assigned to the device since, in general, data can only be used if the origin of the data is known.

The device must be authenticated, in order to decide whether data sent by the device should also be stored for example, since data should only be stored for devices for which a commercial interest also exists in this respect, in general.

The device must be authorized, in order to obtain access to particular data or information. It must be ensured that a device is not misused and that a device does not pose a hazard to a system.

When connecting an automation device to a data processing system the automation device is generally represented in the data processing system by a virtual device. In this case a connection or a link must be established between the actual device and the virtual device. This is necessary so that data which the automation device sends can be assigned to the virtual device. These are often referred to as "cyber-physical devices".

It must be possible to freely assign the data received from the automation device within the data processing system, and within a structure or hierarchy, in particular. One problem with this is that when a device is bought anonymously this data must be captured by the customer who purchases the device and input at the right location in the data processing system. Mistakes can lead to considerable problems and errors in the processes that are based on this—for example servicing processes. For example, in such processes on vehicles it is important to know which brake requires maintenance. If the assignment is incorrect, as a result of a serial number or MAC address (MAC=Media Access Control) of the device becoming muddled for example, this can sometimes endanger vehicle occupants when electronically-aided maintenance processes are used. In addition, features stored in a device may not be unique worldwide or may have to be made unique by combining features or introducing additional features, which entails an extra cost.

In known methods for linking an automation device to a data processing system the unique features of the device, e.g. a serial number or a MAC address of the automation device, or of its network adapter, are used to establish an assignment of the actual device to the virtual device. To this end these features are stored in the data processing system and are linked to its structure. This means that if the automation device transmits these features along with the data to the data processing system, when the data is received it can be assigned. For example in order to undertake a globally unique identification in the case of so-called "public cloud systems," a combination of different features is often required to identify the device.

In other known methods a feature is introduced during the commissioning process of the actual device with a virtual device to establish the link with the data processing system. This feature must be stored permanently on or in the device, and must be used by the device when data is sent. This makes it possible to assign the data to that device when the information is received.

It would therefore be desirable and advantageous to provide an improved method for linking an automation device to a data processing system, and an improved data processing system for performing the method to obviate prior art shortcomings and to provide an easier, more reliable and more secure link to the data processing system.

SUMMARY OF THE INVENTION

According to one aspect of the present invention, a method for linking an automation device to a data processing system comprising creating a virtual device for the automation device in the data processing system, generating in the data processing system an identification number for the virtual device in the data processing system that is unique in the data processing system, assigning the unique identification number to the virtual device, passing the identification number assigned to the virtual device to a configuration tool, using the configuration tool to assign the identification number to a configuration dataset; said configuration tool loading the configuration dataset onto the automation device so as to configure the automation device, storing the assigned identification number in the automation device, and using the identification number assigned by the data processing system for identifying the automation device in interactions between the automation device and the data processing system.

In accordance with the present invention, an automation device is linked to a data processing system by creating a virtual device in the data processing system for the automation device and an identification number is generated in the data processing system for the virtual device. The identification number is generated in accordance with a classification of the virtual device in the data processing system. The identification number assigned to the virtual device is then passed to a configuration tool designed to configure the automation device.

The identification number that is assigned by the configuration tool to the configuration dataset to be loaded onto the automation device, can be loaded onto the automation device and can be stored in the automation device. The identification number can then be used in interactions between the automation device and the data processing system.

Thus no feature stored in the automation device, such as a serial number or MAC address for identifying a virtual device representing the automation device in the data processing system, is used in accordance with the invention. Instead, an identification number for the virtual device is generated in the data processing system and is transmitted to the actual automation device that is used for its interaction with the data processing system. This means a unique identification of the automation device can be achieved, without having to rely on features, such as a serial number or MAC address, that are stored in the device which, when there are a large number of devices in the address space, may possibly mean that uniqueness can no longer be guaranteed.

Additionally, in order to uniquely identify the automation device, the manufacturer no longer needs to apply a feature to the automation device in its production process and administratively assure that that feature identifies the automation device as uniquely as possible. This advantageously reduces costs of manufacturing and handling the automation device, since the device manufacturer is not administratively responsible for device identity. This is particularly advantageous when there is no relationship between the manufacturers of the automation device and the data processing system.

The identification number assigned to the virtual device can be passed to the automation device by a configuration tool designed to configure the automation device. The identification number generated for the virtual device can be stored by the configuration tool and transmitted to the automation device. The identification number assigned to the virtual device can be passed to the configuration tool via a network interface or a storage medium or a buffer store arranged between the data processing system and the configuration tool, for example, or by means of a manual input,. The configuration tool can be configuration software or can be a tool containing configuration software, such as a so-called engineering system for example.

Thus, a configuration tool used to configure the automation device can advantageously also be used to introduce the identification number into the automation device, so that the introduction of the identification number into the automation device gives rise to practically no extra cost.

Furthermore, it is easier to replace and exchange an automation device in the event of defect or failure, since the introduction of an identification number can take place as part of an engineering process that is then already necessary to link the added device any way.

According to another advantageous feature of the present invention, the identification number assigned to the virtual device can be passed to the automation device secretly. Consequently, this reduces the risk of any misuse of the automation device and of that automation device posing any hazard to a system.

According to another advantageous feature of the present invention, the identification number can be used to identify and/or authenticate and/or authorize the automation device that is being identified to the data processing system. This also advantageously provides non-proprietary identification, authentication and/or authorization of automation devices being linked to the data processing system. This not only facilitates the assignment of the automation device to the structure of the data processing system but also makes it possible to generate an identification number that is specific to the system, and hence unique for that data processing system and a classification of the virtual device in the data processing system.

According to another aspect of the present invention, a data processing system is designed to create a virtual device for an automation device to be linked thereto, generate an identification number in the data processing system for the virtual device, and use the identification number for the interaction with the automation device.

A data processing system structured in accordance with invention is able to execute a method, as set forth above, resulting in the administrative and operational security and economic advantages described above.

According to yet another aspect of the present invention, a data processing system configured to create a virtual machine for linking an automation device a the data processing system includes a unique identification number generated by the data processing system for the virtual device, and a configuration tool connected to the data processing system, said configuration tool assigning the unique identification number to a configuration dataset and passing the configuration dataset to the automation device so as to configure the automation device, said automation device being configured to use said identification number to interact with the data processing system

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
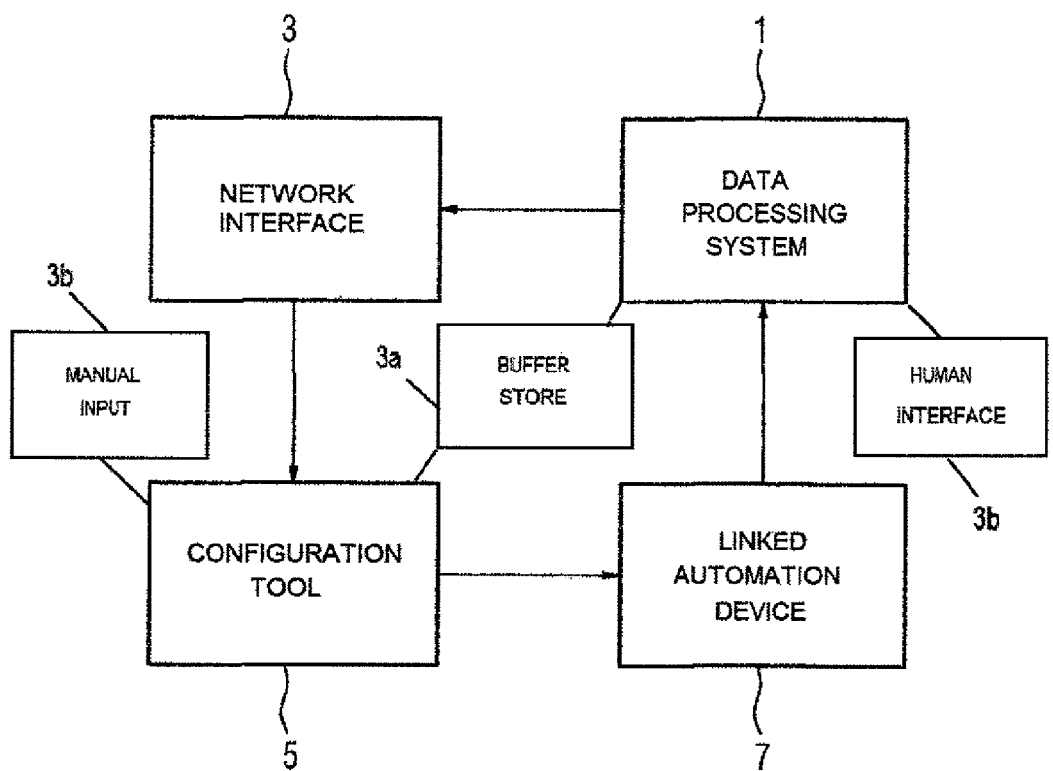
FIG. 1 is a block diagram of a data processing system in accordance with the invention, showing alternative connections between the data processing system and the automation device.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a data processing system 1 having a network interface 3 and a configuration tool 5, and showing an automation device 7. The configuration tool 5 is designed to configure the automation device 7. For the configuration of the automation device 7 a configuration dataset is loaded onto the automation device 7 by means of the configuration tool 5 and is stored in the automation device 7. The network interface 3 is for example a web interface for receiving data from the Internet.

Figure 2:
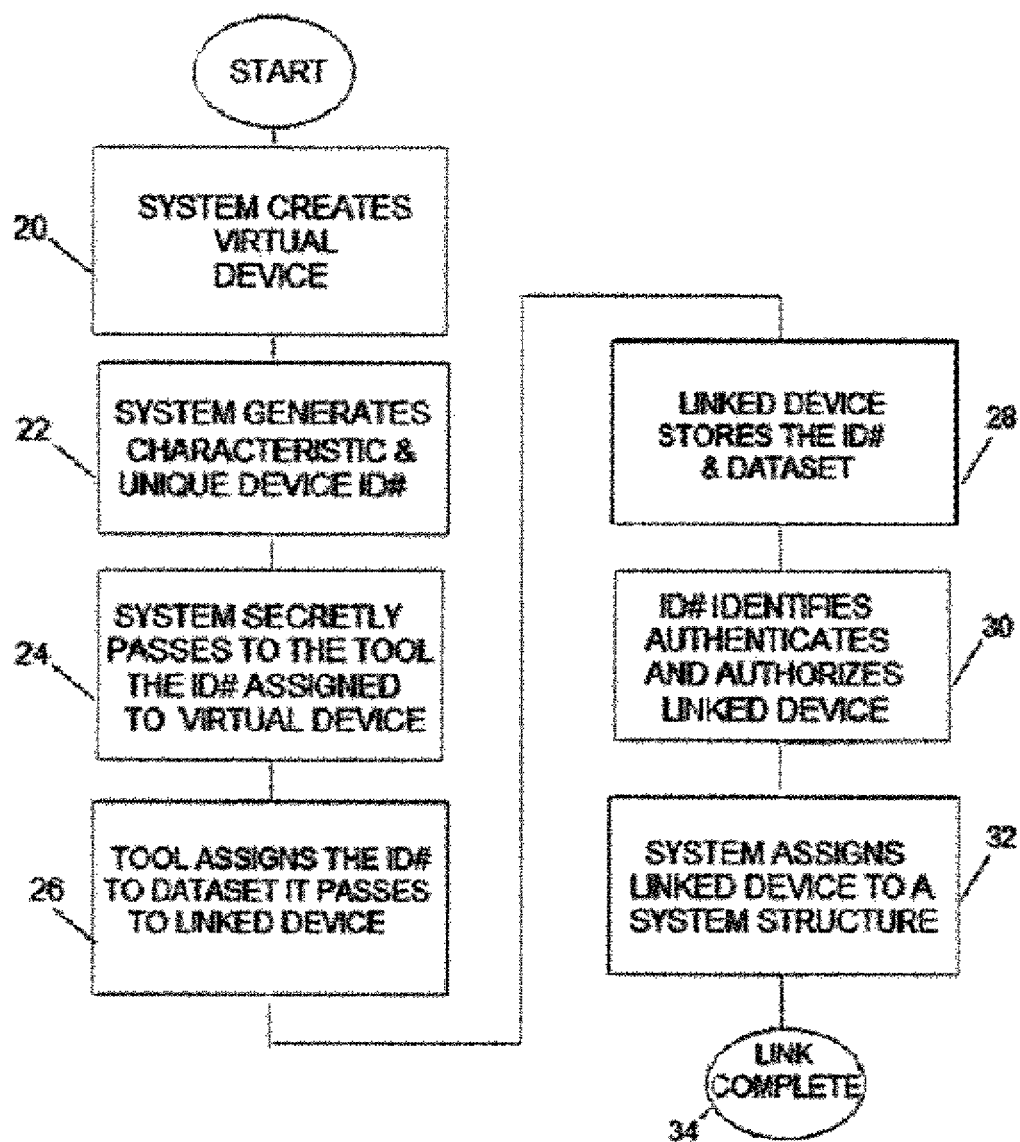
FIG. 2 is a flow chart of the inventive method described herein with reference to the. data processing system in accordance with the invention.

At block 20 in the flow chart of the inventive method provided by FIG. 2, a virtual device is created in the data processing system 1 for the automation device 7 to link the automation device 7 to the data processing system 1. At block 22, a unique identification number is generated for the virtual device in the data processing system 1 that indicates the classification of the virtual device in the structure of the data processing system 1.

Then, at block 24 in the flow chart, the identification number assigned to the virtual device is passed to the configuration tool 5 secretly via the network interface 3 by being encrypted, for example. Instead of being passed via a network interface 3 the identification number assigned to the virtual device can also be passed to the configuration tool 5 in another way, for example by means of a storage medium or buffer store 3a arranged between the data processing system 1 and the configuration tool 5 or by means of a human interface 3b that provides an output to an operator and a manual input 3c to the configuration tool for use by an operator.

At block 26 in FIG. 2, an identification number is assigned by the configuration tool 5 to the configuration dataset and the configuration dataset is passed to and loaded onto the automation device 7. The identification number may be encrypted before being passed to the automation device 7. At block 28, the configuration dataset and identification number are stored in the automation device 7.

At block 30, the identification number is used to identify, authenticate or authorize the automation device 7 in respect of the data processing system 1, and to assign the automation device to a structure within the data processing system 1, at block 32. At block 34 the linking of the automation device 7 to the data processing system 1 is complete.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for linking an automation device to a data processing system comprising:
   creating a virtual device for the automation device in the data processing system;
   generating in the data processing system an identification number for the virtual device in the data processing system that is unique in the data processing system;
   assigning the unique identification number to the virtual device;
   passing the identification number assigned to the virtual device to a configuration tool;
   using the configuration tool to assign the identification number to a configuration dataset; said configuration tool loading the configuration dataset onto the automation device so as to configure the automation device;
   storing the assigned identification number in the automation device; and
   using the identification number assigned by the data processing system for identifying the automation device in interactions between the automation device and the data processing system.

2. The method of claim 1, wherein the unique identification number is assigned to the virtual device as a function of a classification of the virtual device in the data processing system.

3. The method of claim 1, wherein the identification number assigned to the virtual device is passed to the configuration tool using at least one of a group consisting of a network interface, a storage medium, a buffer store and a human interface, that is arranged between the data processing system and the configuration tool.

4. The method of claim 1, wherein the identification number assigned to the virtual device is encoded and then passed secretly to the automation device.

5. The method of claim 1, wherein the unique identification number is used for identifying the automation device to the data processing system.

6. The method of claim 1, wherein the identification number is used for authenticating the automation device in interactions with the data processing system.

7. The method of claim 1, wherein the identification number is used for authorizing the automation device in interactions with the data processing system.

8. A data processing system for executing a method as set forth in claim 1, said data processing system being configured to:
   create a virtual device for an automation device to be linked thereto,
   generate an identification number in the data processing system for the virtual device, and
   use the identification number for the interaction with the automation device.

9. The data processing system of claim 8, wherein the data processing system is configured to pass the identification number assigned to the virtual device to a configuration tool designed to configure the automation device.

10. A data processing system configured to create a virtual machine for linking an automation device a the data processing system, said data processing system comprising:
    a unique identification number generated by the data processing system for the virtual device; and
    a configuration tool connected to the data processing system, said configuration tool assigning the unique identification number to a configuration dataset and passing the configuration dataset to the automation device so as to configure the automation device, said automation device being configured to use said identification number to interact with the data processing system.

11. The data processing system of claim 10, wherein the unique identification number generated by the data processing system indicates the classification of the virtual device in the data processing system.

12. The data processing system of claim 10, wherein the configuration tool is connected to the processing system through at least one member of a group consisting of a network interface, a storage medium, a buffer store and a human interface.

13. The data processing system of claim 10, wherein the data processing system is adapted to encrypt the identification number assigned to the configuration dataset before passing it secretly to the automation device.

14. The data processing system of claim 10, wherein the identification number of the virtual device that is assigned to the configuration dataset assigns the virtual device to a structure in the data processing system.

15. The data processing system of claim 13, wherein the identification number of the virtual device that is assigned to the configuration dataset assigns the automation device to a structure in the data processing system.

* * * * *